US008645862B2

(12) United States Patent
Becker et al.

(10) Patent No.: US 8,645,862 B2
(45) Date of Patent: Feb. 4, 2014

(54) DISPLAYING AND EXECUTING WEB SERVICES IN MULTIPLE CONTENT DOMAINS

(75) Inventors: Craig Henry Becker, Austin, TX (US); Stewart Earle Nickolas, Austin, TX (US); Wayne Elmo Vicknair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 3562 days.

(21) Appl. No.: 10/184,255

(22) Filed: Jun. 28, 2002

(65) Prior Publication Data
US 2004/0024841 A1 Feb. 5, 2004

(51) Int. Cl.
*G06F 3/00* (2006.01)
(52) U.S. Cl.
USPC ............ 715/811; 715/853; 715/747; 715/745
(58) Field of Classification Search
USPC ......... 715/513, 516, 517, 526, 811, 853, 747, 715/745; 707/100, 102
See application file for complete search history.

(56) References Cited

U.S. PATENT DOCUMENTS

| | | | |
|---|---|---|---|
| 5,761,673 A | 6/1998 | Bookman et al. | |
| 5,956,036 A | 9/1999 | Glaser et al. | |
| 6,052,710 A | 4/2000 | Saliba et al. | |
| 6,144,991 A | 11/2000 | England | |
| 6,199,195 B1 | 3/2001 | Goodwin et al. | |
| 6,266,681 B1 | 7/2001 | Guthrie | |
| 6,330,574 B1 | 12/2001 | Murashita | |
| 6,501,488 B2 | 12/2002 | Dvorak | |
| 6,573,907 B1 | 6/2003 | Madrane | |
| 6,604,150 B1 | 8/2003 | Gebhart et al. | |
| 6,622,168 B1 | 9/2003 | Datta | |
| 6,640,255 B1 | 10/2003 | Snyder et al. | |
| 6,658,464 B2 | 12/2003 | Reisman | |
| 6,675,193 B1 | 1/2004 | Slavin et al. | |
| 6,718,516 B1 | 4/2004 | Claussen et al. | |
| 6,734,873 B1 | 5/2004 | Herf et al. | |
| 6,753,886 B1 | 6/2004 | Schuft | |
| 6,757,731 B1 | 6/2004 | Barnes et al. | |
| 6,799,301 B1 | 9/2004 | Francis et al. | |
| 6,802,061 B1 | 10/2004 | Partovi et al. | |
| 6,826,696 B1 | 11/2004 | Chawla et al. | |
| 6,842,781 B1 | 1/2005 | Lavian et al. | |
| 6,845,507 B2 | 1/2005 | Kenton | |

(Continued)

OTHER PUBLICATIONS

Glass, "The Web services (r)evolution: Part 4, Web Services Description Language (WSDL)," http://www-106.ibm.com/developerworks/webservices/library/ws-peer4, 11 pages (Feb. 1, 2001).

(Continued)

*Primary Examiner* — Michael Roswell
(74) *Attorney, Agent, or Firm* — Yee & Associates, P.C.; Jeffrey S. LaBaw

(57) ABSTRACT

A method, computer program product and system for displaying Web services. Web services may be displayed by generating a data model of a description of the Web service. A perspective visitor may be applied to the generated data model where the perspective visitor corresponds to a preselected domain. A perspective of the Web service associated with the preselected domain may be displayed in response to applying the perspective visitor. The perspective visitor may include a visitor pattern for encapsulating an operation to be performed on elements of the data model.

12 Claims, 12 Drawing Sheets

(56) References Cited

U.S. PATENT DOCUMENTS

| | | | |
|---|---|---|---|
| 6,889,363 | B2 | 5/2005 | Maloney |
| 6,889,379 | B1 | 5/2005 | Lindhorst et al. |
| 6,904,600 | B1 | 6/2005 | James et al. |
| 6,915,454 | B1 | 7/2005 | Moore et al. |
| 6,961,929 | B1 | 11/2005 | Pelegri-Llopart et al. |
| 6,983,421 | B1 | 1/2006 | Lahti et al. |
| 6,986,147 | B2 | 1/2006 | Gooding |
| 7,000,218 | B2 | 2/2006 | Gerken |
| 7,080,350 | B2 | 7/2006 | Saimi et al. |
| 7,089,561 | B2 | 8/2006 | Morrison et al. |
| 7,127,700 | B2 * | 10/2006 | Large .................. 717/100 |
| 7,139,830 | B2 | 11/2006 | Sato et al. |
| 7,162,687 | B2 | 1/2007 | Pelegri-Llopart et al. |
| 7,200,818 | B2 | 4/2007 | Becker et al. |
| 7,426,545 | B2 | 9/2008 | Becker et al. |
| 7,739,658 | B2 | 6/2010 | Watson et al. |
| 7,792,929 | B2 | 9/2010 | Becker et al. |
| 2001/0037490 | A1 | 11/2001 | Chiang |
| 2001/0047402 | A1 | 11/2001 | Saimi et al. |
| 2002/0054137 | A1 | 5/2002 | Dvorak |
| 2002/0124055 | A1 | 9/2002 | Reisman |
| 2002/0184145 | A1 | 12/2002 | Sijacic et al. |
| 2003/0110416 | A1 | 6/2003 | Morrison et al. |
| 2003/0120659 | A1 * | 6/2003 | Sridhar ................. 707/100 |
| 2003/0226107 | A1 | 12/2003 | Pelegri-Llopart et al. |
| 2004/0001089 | A1 | 1/2004 | Becker et al. |
| 2004/0003054 | A1 | 1/2004 | Becker et al. |
| 2004/0003130 | A1 | 1/2004 | Becker et al. |
| 2004/0049574 | A1 | 3/2004 | Watson et al. |
| 2004/0098704 | A1 | 5/2004 | Becker et al. |
| 2004/0205550 | A1 | 10/2004 | Gerken |
| 2004/0225724 | A1 | 11/2004 | Pavlik et al. |
| 2004/0225749 | A1 | 11/2004 | Pavlik et al. |
| 2004/0225959 | A1 | 11/2004 | D'Orto et al. |
| 2009/0164563 | A1 | 6/2009 | Becker et al. |

OTHER PUBLICATIONS

Aranha et al., "Web Systems Acceptance Tests and Code Generation," http://www.cwi.nl/events/2002/wtixp/papers/wtixp2002-proceedings.pdf, pp. 39-42 (May 27, 2002).

Parsons, "IDL Compiler," http://www.cs.wustl.edu/(doc/RandD/TAO/Status/idl_compiler.html, 3 pages (Dec. 6, 2001).

Parry, "Visitor Pattern," http://www.castle-cadenza.demon.co.uk/visitor.htm, 4 pages (Dec. 20, 2001).

"CapeStudio 3 and CapeConnect 3.5, User's Guide. Chapter 7: Generating code from WSDL files," http://www.capeclear.com/products/manuals/capestudio/three/users_guide.pdf, pp. iii-ix and 163-184.

Lerner, "At the Forge: Custom JSP Actions", Linux Journal, Jul. 2001, pp. 1-7.

Jakarta Project: 10 Tag library: Tags for working with FTP, HYYP, HTTPS, XML-RPC and SOAP, Version 1.0, Mar. 2000, pp. 1-13. http://jakarta.apache.org/taglibs/doc/io-doc/.

Brown, "Encapsulate reusable functionality in JSP tags", JavaWorld, Aug. 2000, pp. 1-7. http://www.javaworld.com/javaworld/jw-08-2000-jw-0811-jstags_.p.html, retrieved Dec. 15, 2005.

Aranha et al., "Web Service Acceptance Tests and Code Generation", Proceedings of Workshop on Testing in XP WtiXP 2002, May 2002, Italy, pp. 1-59. http://www.cwi.nl/wtixp2002/.

"JavaScript Language Specification", JavaScript 1.1, Oct. 3, 2006, pp. 1-107.

Itoh, "Web Service Development Environment, Monthly Solution," Solution IT, RickTelecom, Inc., Japan, 14(7), pp. 101-106, Jun. 17, 2002.

Itoh, "Web Service Development Environment, Monthly Solution," Solution IT, RickTelecom, Inc., Japan, 14(7), pp. 101-106, Jun. 17, 2002, 12 pages. (English Translation).

Office Action, dated Jul. 28, 2005, regarding U.S. Appl. No. 10/184,330, 9 pages.

Final Office Action, dated Jan. 27, 2006, regarding U.S. Appl. No. 10/184,330, 11 pages.

Appeal Brief, dated Jun. 19, 2006, regarding U.S. Appl. No. 10/184,330, 22 pages.

Response to Non-Compliant Appeal Brief, dated Aug. 17, 2006, regarding U.S. Appl. No. 10/184,330, 25 pages.

Office Action, dated Nov. 13, 2006, regarding U.S. Appl. No. 10/184,330, 16 pages.

Office Action, dated Apr. 18, 2007, regarding U.S. Appl. No. 10/184,330, 9 pages.

Final Office Action, dated Oct. 1, 2007, regarding U.S. Appl. No. 10/184,330, 11 pages.

Appeal Brief, dated Feb. 5, 2008, regarding U.S. Appl. No. 10/184,330, 23 pages.

Notice of Allowance, dated May 7, 2008, regarding U.S. Appl. No. 101184,330, 16 pages.

Office Action, dated Sep. 30, 2005, regarding U.S. Appl. No. 10/185,779, 11 pages.

Final Office Action, dated Mar. 21, 2006, regarding U.S. Appl. No. 10/185,779, 15 pages.

Notice of Allowance, dated Sep. 11, 2006, regarding U.S. Appl. No. 10/185,779, 13 pages.

Office Action, dated Jun. 30, 2005, regarding U.S. Appl. No. 10/185,796, 10 pages.

Final Office Action, dated Jan. 3, 2006, regarding U.S. Appl. No. 10/185,796, 15 pages.

Office Action, dated Nov. 2, 2005, regarding U.S. Appl. No. 10/294,941, 9 pages.

Examiner's Interview Summary, dated Jan. 27, 2006, regarding U.S. Appl. No. 10/294,941, 14 pages.

Final Office Action, dated Apr. 21, 2006, regarding U.S. Appl. No. 10/294,941, 12 pages.

Office Action, dated Dec. 9, 2009, regarding U.S. Appl. No. 12/165,114, 12 pages.

Notice of Allowance, dated May 17, 2010, regarding U.S. Appl. No. 12/165,114, 6 pages.

* cited by examiner

WeatherRetriever.GetTemperature
Java View
TagLib View

```
<%@ taglib url= "http://com.ibm.webservice/webservice-taglib" prefix="webservice"%>

<% Object result = null; %>

<webservice:call service="WeatherRetriever" operation="GetTemperature"
port="WeatherRetrieverSoap"
wsdl="http://www.vbws.com/services/weatherretriever.asmx?WSDL">
    <webservice:input name="zipCode" value="78758"/>
    <webservice:output>
        <% result = serviceResult; %>
    </webservice:output>
</webservice:call>
```

[Execute tag (results below)]  [Execute tag (results in new window)]

Message View

WSDL View

Fig. 6.1

WeatherRetriever.GetTemperature
Java View
public float GetTemperature(java.lang.String zipCode)

java.lang.String zipCode = "stringValue";
float result;

mappings.WeatherRetriever proxy = new mappings.WeatherRetriever();
result = proxy.GetTemperature(zipCode);

[Execute Java (results below)] [Execute Java (results in new window)]

TagLib View

Message View

WSDL View

Fig. 6.2

```
WeatherRetriever.GetTemperature

<?xml version="1.0" encoding="UTF-8"?>
<SOAP-ENV:Envelope
 xmlns:SOAP-ENV="http://schemas.xmlsoap.org/soap/envelope/"
 xmlns:soapenc="http://schemas.xmlsoap.org/soap/encoding/"
 xmlns:xsd="http://www.w3.org/2001/XMLSchema" xmlns:xsi="http://www.w3.org/2001/XML
Schema-instance">
  <SOAP-ENV:Body SOAP-ENV:encodingStyle="http://schemas.xmlsoap.org/soap/encoding/">
618─<ns1:GetTemperature xmlns:ns1="http://tempuri.org/">
620─     <zipCode xsi:type="xsd:string">78758</zipCode>
      </ns1:GetTemperature>
  </SOAP-ENV:Body>
</SOAP-ENV:Envelope>

[Execute Message (results below)] [Execute Message (results in new window)] ─612

WSDL View
```

DISPLAYING AND EXECUTING WEB SERVICES IN MULTIPLE CONTENT DOMAINS

CROSS-REFERENCE TO RELATED APPLICATIONS

Related subject matter may be found in the following commonly assigned, co-pending U.S. patent applications, which are hereby incorporated by reference herein:

Ser. No. 10/184,330, entitled "SYSTEMS AND METHODS FOR TRANSPARENTLY ACCESSING WEB APPLICATIONS REMOTELY AND LOCALLY";

Ser. No. 10/185,779, entitled "SYSTEMS AND METHODS FOR MESSAGING IN A MULTI-FRAME WEB APPLICATION"; and Ser. No. 10/185,796, entitled "SYSTEMS AND METHODS FOR ACCESSING WEB SERVICES USING A TAG LIBRARY".

TECHNICAL FIELD

The present invention is related in general to data processing systems, and in particular, to accessing and exploring Web services in a distributed data processing system.

BACKGROUND INFORMATION

The advent of networked data processing systems, and, particularly, the network of networks referred to as the Internet, has spurred the introduction of distributed data processing services. In such systems, a client, typically remotely connected to the service provider via one or more networks, accesses data processing services which are implemented on the remote data processing system which returns the results of the data processing activity to the client. It has become common to use the services represented by the World Wide Web (WWW) with its graphical user interface (GUI) orientation to provide the interface to such distributed data processing services.

Typically, in such distributed processing systems, the client sends a request to the server. The request may include one or more parameters which may be inputs to the particular service requested.

On the server side, the system builds a Web page for returning the response to the requesting client. The server accesses a server page containing code that defines the Web page. Embedded in the code for generating the page, i.e. HTML script, is code that is executable by the server to generate the requested data processing service to generate the necessary HTML script to display the results on the client machine.

A Web browser running on the client machine is an application that can interpret the HTML and display the page on a conventional display such as a CRT monitor connected to the client machine. Commercially available Web browsers include Netscape Navigator®, Mozilla, Internet Explorer®, iCab, and Opera. Technologies for implementing distributed computing services in this way include Active Server Pages (ASP) and Java™ Server Pages (JSP). Additionally, such services may access server-side application software to perform some or all of the requested tasks via an environment-independent interprocess communication application program interface (API) such as DCOM (Distributed Component Object Model), CORBA (Common Object Request Broker Architecture) or Remote Method Invocation (RMI). In response to execution of the page by the browser, the application software generates dynamic data and returns the data to the client which then displays the data in accordance with the code defining the page. Additionally, as described further below, the server-side application need not reside on the same hardware as the page server, but may be deployed on other hardware that may be remote from both the client and the page server.

The increasing deployment of XML compliant systems has led to the development of distributed data processing technologies that are not constrained to the object-model specific protocols, such as DCOM, RMI or CORBA. XML which refers to the eXtensible Markup Language is a tag-based markup language for describing structured data. Unlike HTML, XML tags are not predefined. XML is a meta-markup language. XML includes a mechanism, XML schema and data type definitions (DTD), to convey information about a document's structure and data types. The XML specification is promulgated by the World Wide Web Consortium (W3C). XML (and derivatives thereof) enable the access to distributed data processing services using standard Internet protocols. Such distributed, application-to-application data processing implementations may, generically, be referred to as Web services. An XML derivative that may be used to describe Web services is the Web Service Definition Language (WSDL). A WSDL document defines the messages a particular Web service accepts and generates.

Although the DWSL is a rich language for describing Web services, abstracting and evaluating the Web service interface from the WSDL description is a challenge for the developer of a Web page that may use the Web service. Web developers have a multiplicity of approaches available to them for developing Web pages. That is, for any Web programming problem, there are a multiplicity of programming solution domains that the user may choose. For example, some developers may prefer writing Java Server Pages (JSP) tags to deliver Web content. Others may prefer writing in Java™ and develop content using Java™ servlets. Still others may use Javascript. Each of these classes of Web developers will have a different programming perspective and different requirements when analyzing a Web service for potential use in an application. The "raw" WSDL description of the Web service may not be the effectively meet the requirements of these developers. Thus, there is a need in the art for mechanisms to evaluate Web services whereby the WSDL information is conveyed in a perspective, or equivalently, view that is consonant with the developer's preferred programming domain. Additionally, there is a further need for a mechanism to execute sample calls to the Web service using that view of the Web service, and to execute sample calls to the service.

SUMMARY OF THE INVENTION

The problems outlined above may at least in part be solved in some embodiments by evaluating the Web services interface and executing sample calls to the service. In one embodiment of the present invention, a method for displaying Web services may comprise the step of generating a data model of a description of the Web service. The method may further comprise the step of applying a perspective visitor to the generated data model where the perspective visitor corresponds to a preselected domain. The method may further comprise the step of displaying a perspective of the Web service associated with the preselected domain in response to applying the perspective visitor. The perspective visitor may comprise a visitor pattern for encapsulating an operation to be performed on elements of the data model.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
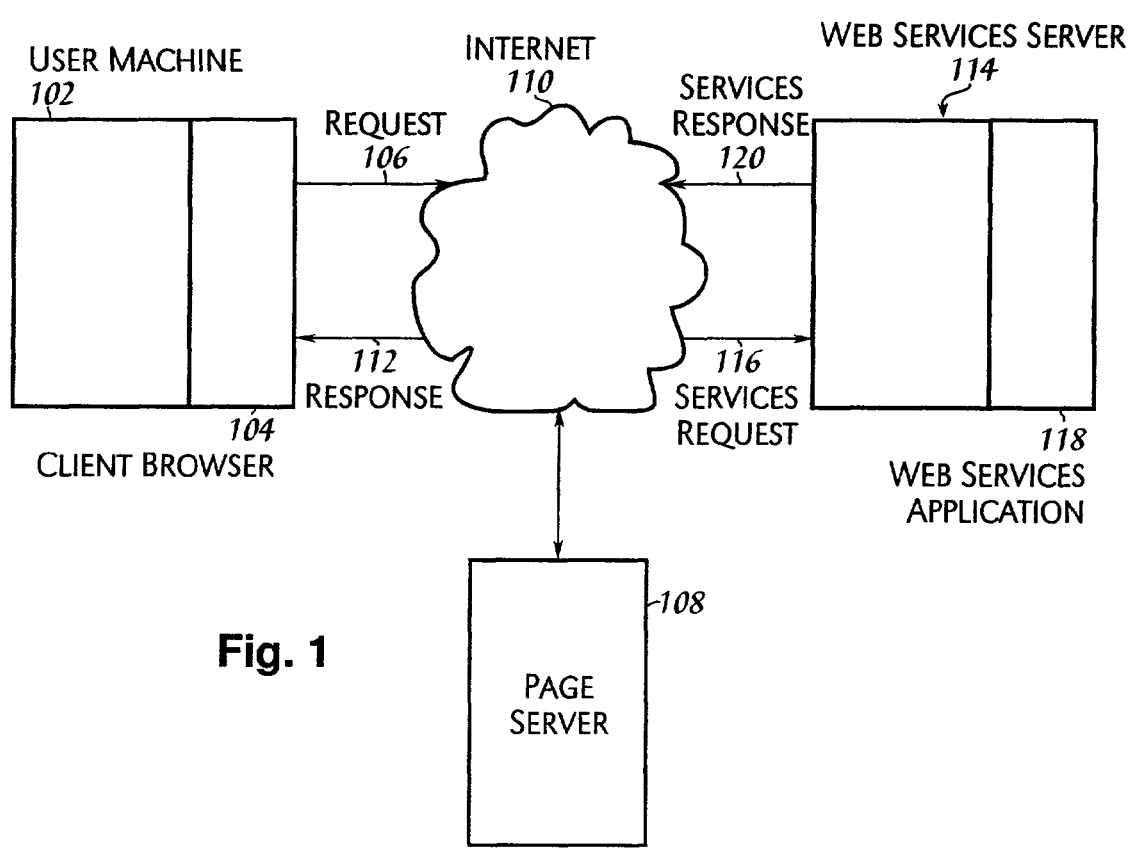
FIG. 1 illustrates a network architecture for providing Web services which may be used in conjunction with the present invention.

In the following description, numerous specific details are set forth to provide a thorough understanding of the present invention. For example, exemplary code for accessing particular web services may be described, however it would be recognized by those of ordinary skill in the art that the present invention may be practiced without such specific details, and in other instances, well-known circuits have been shown in block diagram form in order not to obscure the present invention in unnecessary detail. Refer now to the drawings wherein depicted elements are not necessarily shown to scale and wherein like or similar elements are designated by the same reference numeral through the several views.

Referring to FIG. 1, there is illustrated a distributed data processing system architecture 100 which may be used for accessing web services in accordance with the present inventive principles. (Architecture 100 may be understood as a logical view of the architecture of a distributed data processing system. In other words, web services server 114 may be viewed as a logically distinct component, whether physically deployed on the same, or, alternatively, different hardware as page server 108.) Currently, a web service is accessed via an XML message conforming, for example, to SOAP. Client browser 104 initiates a request 106, which is transmitted to the targeted web server, illustrated by page server 108, in FIG. 1, via a network, shown in FIG. 1 as Internet 110.

Page server 108 responds to the request by returning the requested page in response 112. The requested page may include data that is to be generated dynamically. Such dynamic data may be generated locally on the user machine in response to client browser 104 executing the script defining the page returned in response 112. Additionally, dynamic data may be generated by a remote process. This may further be in response to code in the page returned by page server 108 in response 112 via a request to a remote server, such as web services server 114. On execution of the page received in response 112, the corresponding code in the page generates service request 116 which is directed to web services server 114. Web services server 114 may execute a web services application 118 in response that generates the dynamic data. The data is returned in a services response 120 to page server 108. The data may be returned as XML data via a SOAP message. SOAP is a proposed standard, promulgated by the W3C (World Wide Web Consortium). (The draft specifications for SOAP 1.2 may be found in Simple Object Access Protocol 1.2, http://www.w3.org/TR/SOAP12.) The SOAP specification is hereby incorporated herein by reference. (SOAP was initially an acronym for Simple Object Access Protocol; as of version 1.2 it is no longer an acronym.) Page server 108 incorporates the data in a page and sends the page to the client browser in a response 112.

To request the web service for generating the dynamic data, the page sent to client browser 104 in a response 112 must have the appropriate code to access the web service. For example, the request may be embedded in a SOAP message. However, as previously described, web services are typically defined in a WSDL document. A methodology for generating multiple perspectives of the Web service, including a SOAP perspective, will be discussed in conjunction with FIGS. 3-5. (A perspective may refer to a view of a Web services WSDL in the context of a particular domain. Domains may include, Java, JSP, and Visual Basic, in addition to SOAP.)

The flowcharts provided herein are not necessarily indicative of the serialization of operations being performed in an embodiment of the present invention. Steps disclosed within these flowcharts may be performed in parallel. The flowcharts are indicative of those considerations that may be performed to produce the operations available for generating and displaying multiple perspectives of a Web service. It is further noted that the order presented is illustrative and does not necessarily imply that the steps must be performed in order shown.

Figure 2:
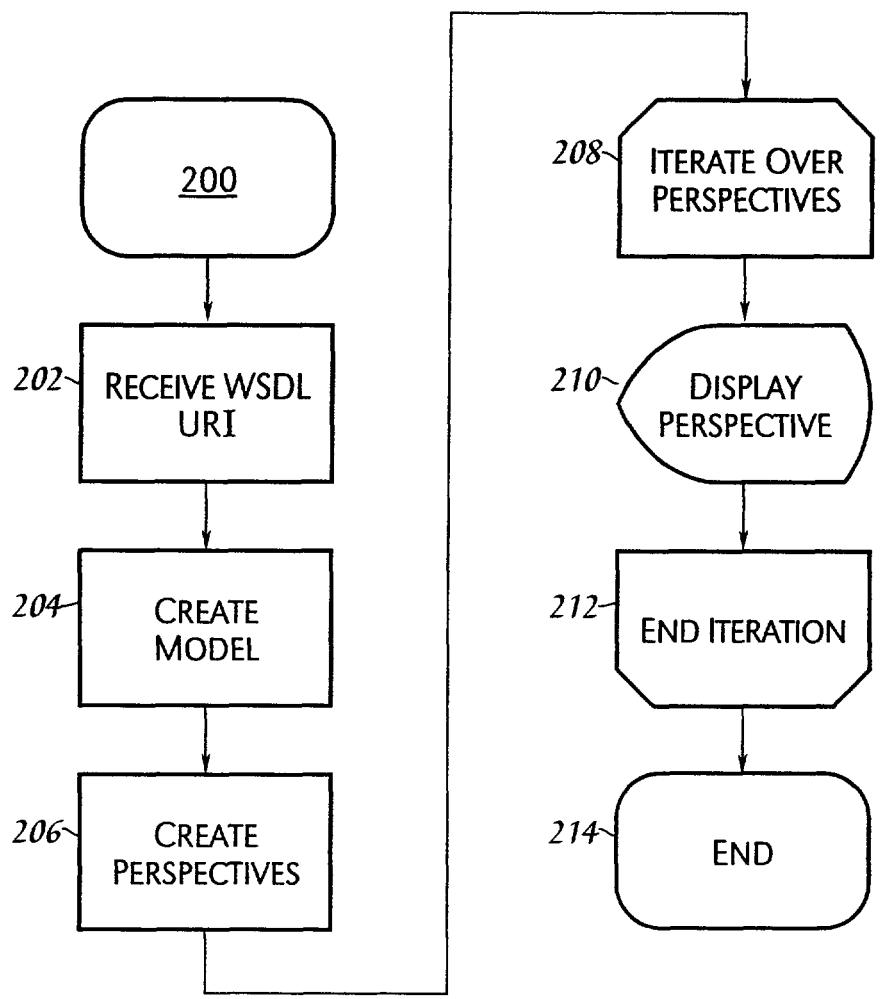
FIG. 2 illustrates in flow chart form, a methodology for providing multiple perspectives of a web service in accordance with an embodiment of the present invention.

Refer now to FIG. 2 illustrating, in flow chart form, a methodology 200 for providing multiple perspectives of a web service in accordance with an embodiment of the present invention. In step 202, a URI (Uniform Resource Identifier) of the WSDL document defining the web service is received. For example, the URI may be received from a web browser running on a client machine of a web page developer exploring the web service to use the web service in a web page under development. In step 204 a data model of the web service as defined in the WSDL document is created. Step 204 will be described in further detail in conjunction with FIG. 3.

In step 206, the perspectives are created using the data model from step 204. The generation of the perspectives will be further described in conjunction with FIG. 6.

In step 208, an iteration over the perspectives created in step 206 is initiated. For each perspective, the perspective is displayed in step 210, and in step 212 the iteration over the perspectives terminates. Process 200 concludes in step 214.

Figure 3:
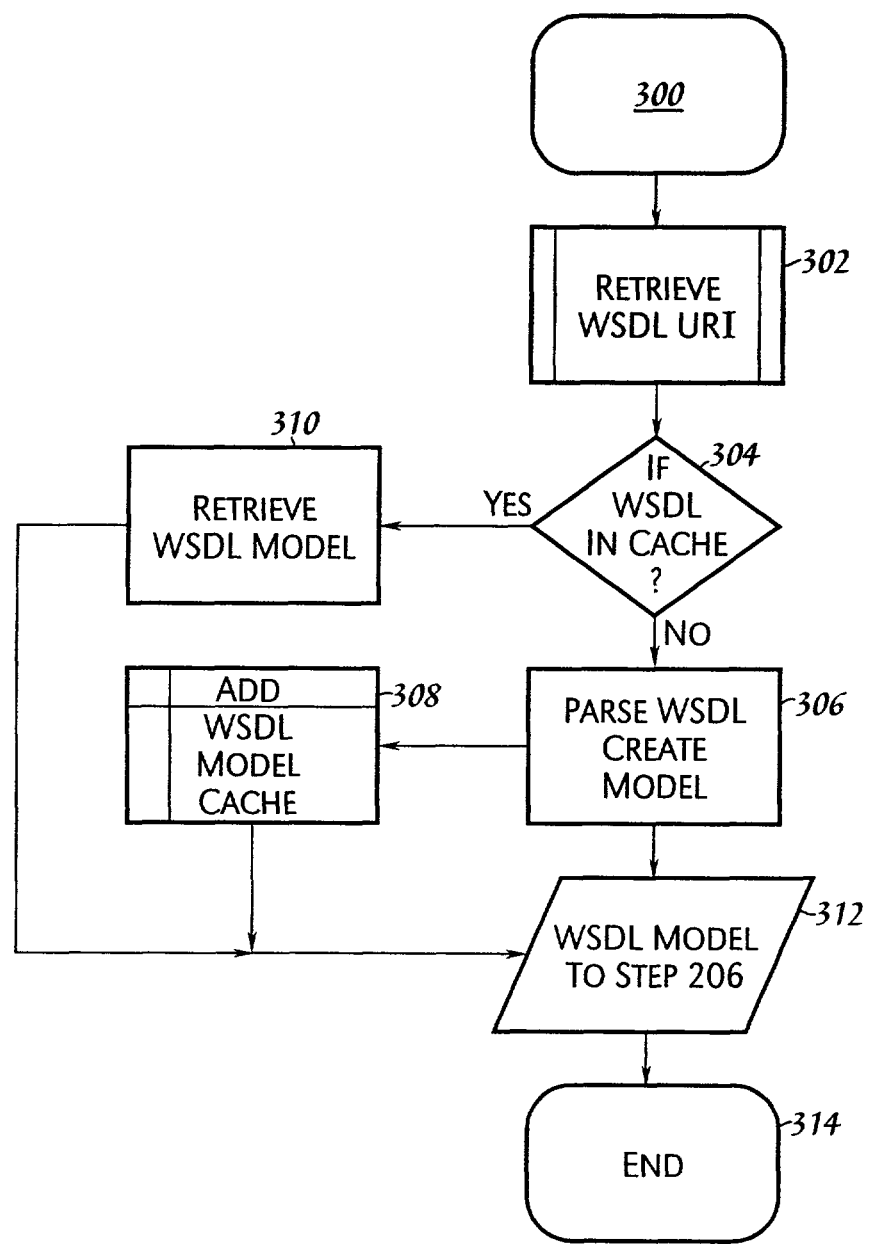
FIG. 3 illustrates in flow chart form, a portion of the methodology of FIG. 2 in further detail.

Refer now to FIG. 3 illustrating in further detail step 204 of FIG. 2. In step 302, the URI received in step 202 of FIG. 2 is retrieved, and in step 304 it is determined if the WSDL document corresponding to the URI is in cache. As would be recognized to those of ordinary skill in the art, a WSDL data model may be cached in analogous fashion to caching a Web page to reduce bandwidth demands. In this way, a previously generated data model of a WSDL document may be more quickly returned and processing bandwidth conserved. If the WSDL data model is not in cache, in step 306 the WSDL document is parsed to create a data model thereof.

Figure 4:
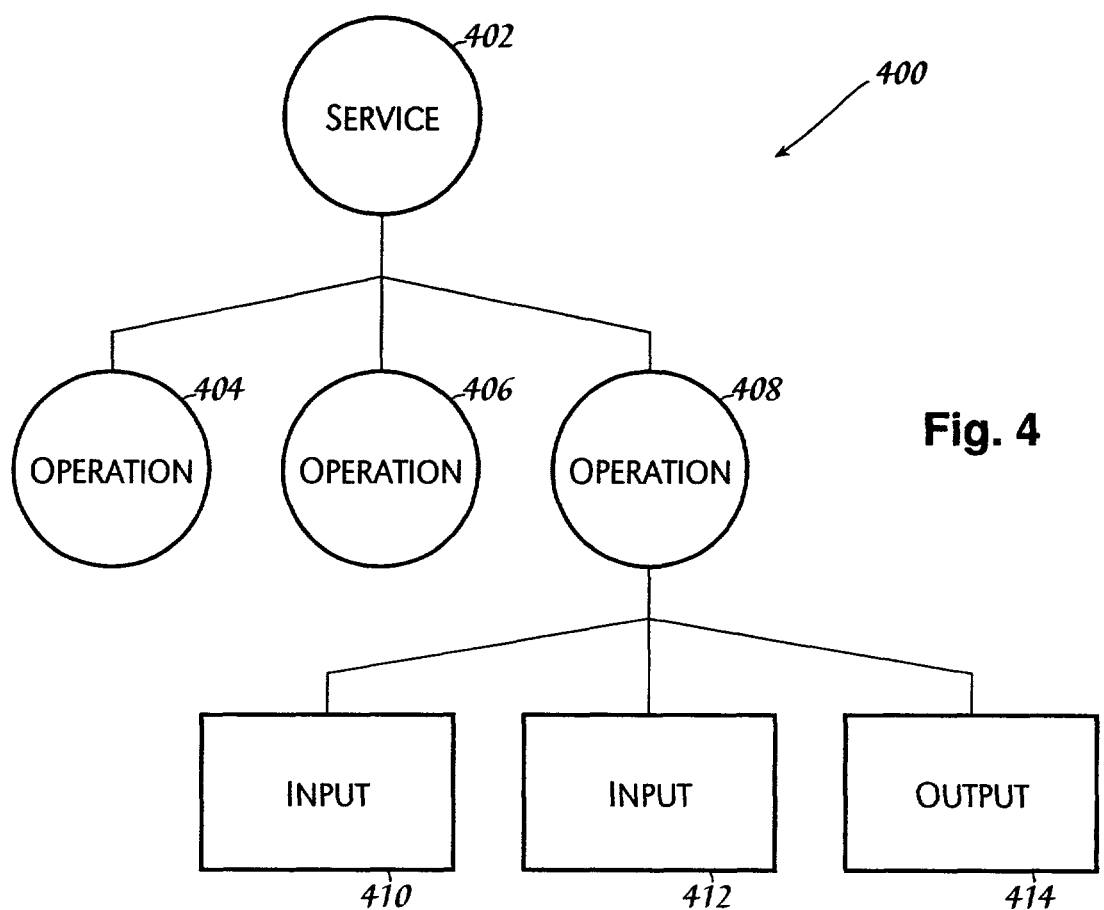
FIG. 4 illustrates an exemplary abstract data model of a WSDL page in accordance with the present inventive principles.

A data model of the WSDL page may be a tree-like representation of the page. Referring to FIG. 4, an illustrative data model 400 of a simplified WSDL page is shown. The tree includes multiple nodes 402-464. Node 452 identifies the particular Web service. Nodes 404, 406 and 408 represent operations performed by the service. Operation 408 takes two inputs, input 410 and input 412, and generates output 414.

Returning to FIG. 3, in step 308, the data model is added to the cache.

Conversely, if the WSDL page is in cache, the previously cached WSDL data model is retrieved, step 310. In step 312, the data model is input to step 206, FIG. 2, and step 204 terminates.

Figure 5:
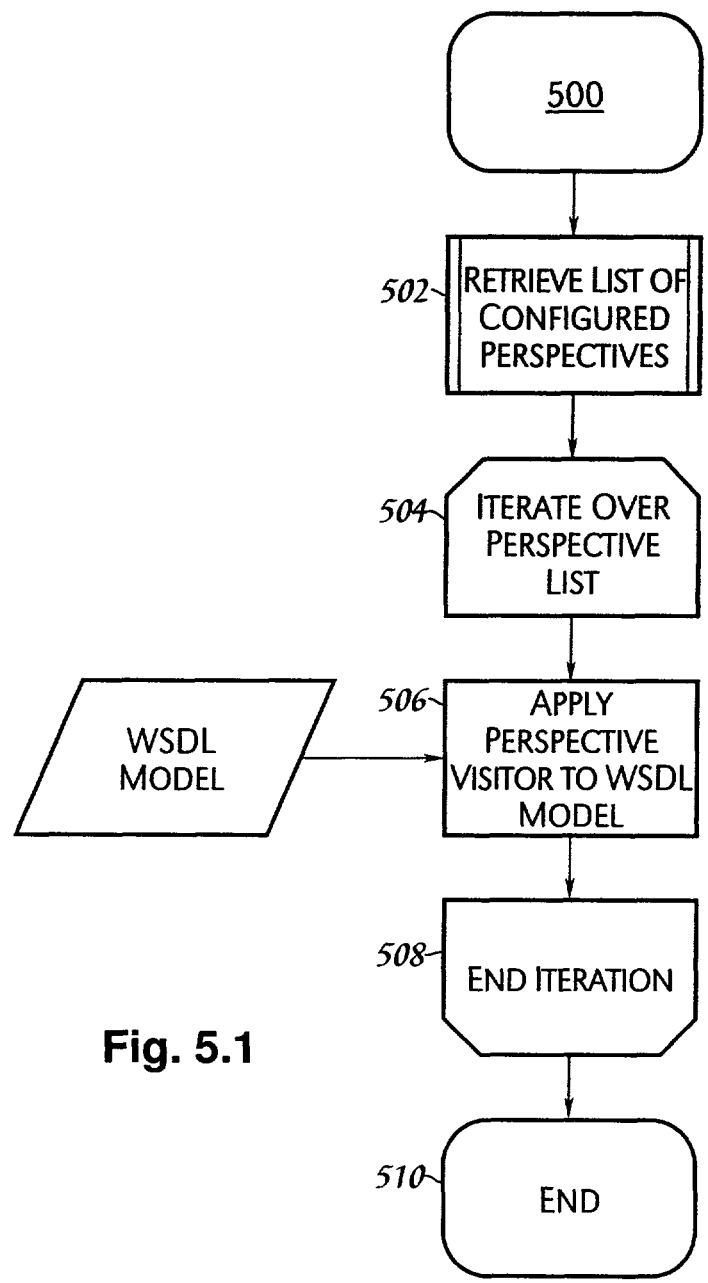
FIGS. 5.1 and 5.2 illustrate, in flow chart form, another portion of the methodology of FIG. 2 in further detail.

Referring now to FIGS. 5.1 and 5.2, FIGS. 5.1 and 5.2 illustrate step 306, FIG. 3 in further detail. In step 502, a list of configured perspectives is retrieved. A configured perspective may refer to a perspective for which a visitor pattern, discussed further in conjunction with step 506, is implemented. Thus, for example, the list of configured perspectives may include a Java perspective, a JSP perspective, a Visual Basic perspective, a SOAP perspective, and a raw WSDL perspective. It would be recognized by those of ordinary skill in the art that the foregoing list is not exhaustive, and additional perspectives representing other program domains may be included in alternative embodiments of the present invention, and such embodiments would fall within the spirit and scope of the present invention.

In step 504, an iteration loop over the perspective list is entered. In step 506, a perspective visitor pattern is applied to the WSDL data model, for each perspective in the list. As described hereinabove, the WSDL data model may be represented as a tree-like data structure in which the nodes thereof correspond to operations of the web service, and respective inputs and outputs thereto. A visitor pattern is a mechanism to encapsulate an operation to be performed on the elements of the data model. (A visitor pattern may also be referred to in the object-oriented programming art as a visitor design pattern or, alternatively, for the purposes herein simply as a "visitor.") In other words, the perspective visitor is an object that encapsulates operations on the nodes of the WSDL data model, in particular the operation of rendering a perspective of the WSDL node. Thus, for example, a Java perspective visitor may render the WSDL data model into Java snippets. Thus, calling this perspective visitor on an node representing a Web service operation, such as node 404, FIG. 4, may render the node into a Java code snippet, in an HTML text field, that represents how that particular operation might be invoked. Similarly a taglib perspective visitor might render the node as a taglib representation of how that operation might be invoked. Thus, the perspective visitor abstracts information about the nodes in the WSDL data model (which itself is a representation of the WSDL description of the Web service) and embeds it in a corresponding perspective. Note that in accordance with object-oriented programming principles with respect to visitor patterns, the perspective visitors may be concrete child classes of an abstract parent visitor class.

(See, e.g. Erich Gamma, Richard Helm, Ralph Johnson and John Vlissides, *Design Patterns, Elements of Reusable Object-Oriented Software* (Addison Wesley, 1995), Chap. 5, pp. 331-344, which is incorporated herein by reference) (discussing visitor patterns in general).

Step 506 may be performed by the visitor traversing the WSDL data model tree. At each node, the node "accepts" the perspective visitor which sends a message to the perspective visitor. In other words, the node makes a call to the perspective visitor, passing itself in, and the perspective visitor executes its methods to populate the particular perspective it generates. Thus, because the node itself calls back to the perspective visitor, and the node is passed to the perspective visitor by the node itself, the perspective visitor may execute the appropriate polymorphic method to generate the perspective corresponding to the calling node of the data structure, that is the tree-like data model of the WSDL document. These operations are illustrated in steps 552-562 of FIG. 5.2. As indicated in FIG. 5, the WSDL data model from step 412, FIG. 4 is input to step 506. Step 506 is repeated for each perspective in the list, in the iteration loop entered in step 504. The iteration loop terminates in step 508, and in step 510, step 306 ends.

Figure 6:
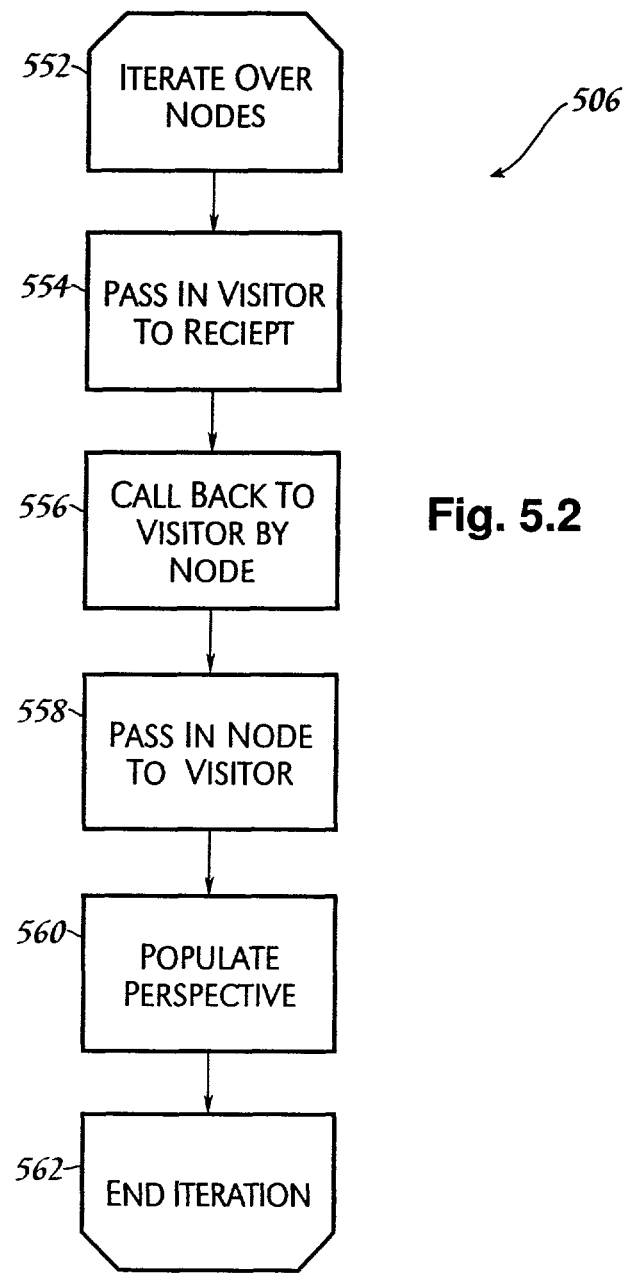
FIGS. 6.1-6.3 illustrate exemplary Graphical User Interface (GUI) views of perspectives of a Web services page in accordance with the present inventive principles.

FIGS. 6.1-6.3 illustrate exemplary GUI windows 602a-c, respectively displaying a JSP taglib perspective, Java™, and SOAP message perspective for a Web service that provides weather data. (JSP taglibs are discussed in the commonly-owned copending U.S. patent application entitled "Systems And Methods For Accessing Web Services Using A Tag Library," Ser. No. 10/185,796, hereby incorporated herein by reference.) Such a weather service may be used, for example, to retrieve weather data to display a current temperature and a forecast for a particular locale in a Web page. The WSDL document for the service may specify that when the browser sends a request to generate the data, call the "GetTemperature" method, and the inputs needed are a zip code, or other locale identifier. Correspondingly, in window 602a, the operation 604 is specified to be, in taglib call 606 to "GetTemperature." Similarly, the input type 608 is specified as "zipcode." Thus, the locale for which the service will provide the weather data is specified by setting a zip code. As described below in conjunction with FIG. 7, the developer may make a sample call to test the service, and a value 610 has been set by the user to a zip code of "78758." The user may execute the service, as discussed hereinbelow, by "clicking" on button 612. Similarly, a Java perspective, window 602b, displays the "GetTemperature" method, 614, with argument "zipcode," 616, as input data. In similar fashion, the SOAP perspective, window 602c, includes the "GetTemperature" operation 616, and "zipcode" input 620 in the SOAP message body 622.

Figure 7:
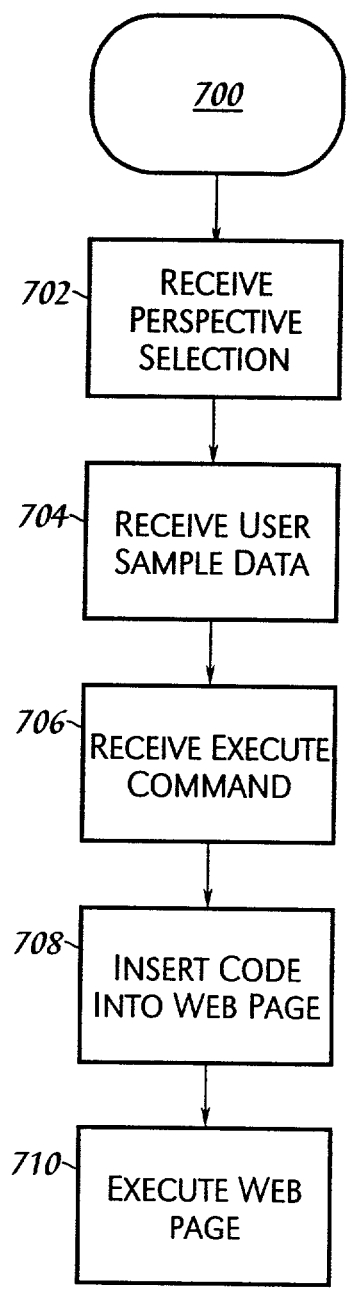
FIG. 7 illustrates, in flow chart form, a methodology for executing a Web service in accordance with the present inventive principles.

Refer now to FIG. 7 illustrating in flow chart form, a process 700 for executing sample calls to a web service. Process 700 may be used in conjunction with the perspective generated in accordance with the methodology of FIG. 3. In step 702, a perspective selection is received in response to user input. In step 704, user sample data is received. This sample data may be entered in the perspective window, such as one of the prospective windows 602A-602D illustrated in FIGS. 6.1-6.4, respectively. In step 706, an execute request is received. A user may initiate the execute request by activating a "button" or similar user input device. In step 708, the corresponding code, in the domain associated with the particular perspective selected in step 702 is inserted into the web services page. In step 710, the user's client executes the page, for example, via the browser, such as browser 104, FIG. 1. Execution of the web page generates a request to the web service in a manner described hereinabove in conjunction with FIG. 1. The request includes the exemplary input data supplied by the user and received in step 704. In response to the sample data, the web services application, such as web services application 118, FIG. 1, generates a result based on the sample data, and returns a message such as a SOAP message containing the result back to the client for display 1.

Figure 8:
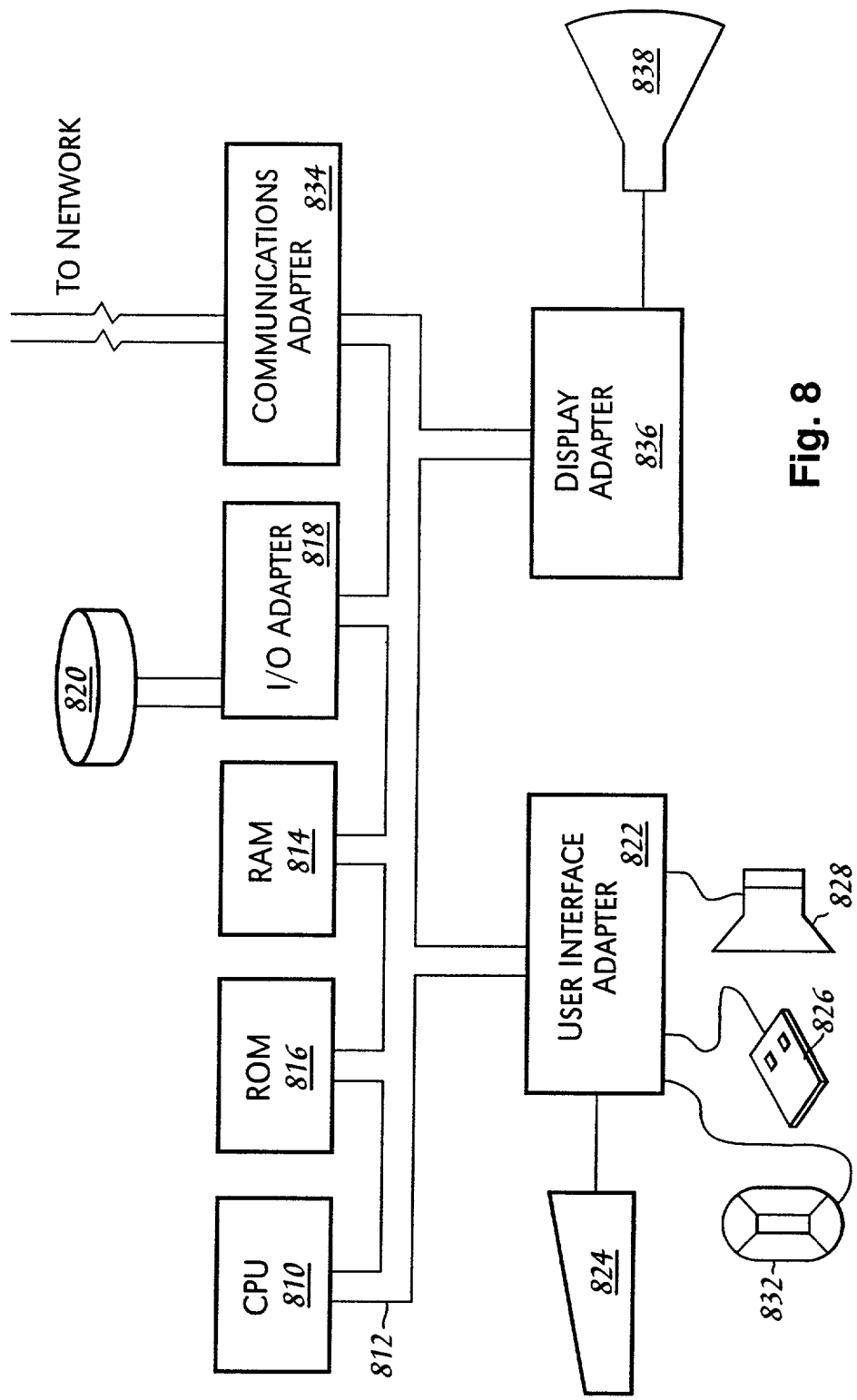
FIG. 8 illustrates, in block diagram form, a data processing system for generating document components for accessing Web services in accordance with an embodiment of the present invention.

A representative hardware environment for practicing the present invention is depicted in FIG. 8, which illustrates an exemplary hardware configuration of data processing system 800 in accordance with the subject invention. For example, client 104, FIG. 1 may be implemented in accordance with data processing system 800. System 800 includes central processing unit (CPU) 810, such as a conventional microprocessor, and a number of other units interconnected via system bus 812. Data processing system 800 includes random access memory (RAM) 814, read only memory (ROM) 816, and input/output (I/O) adapter 818 for connecting peripheral devices such as disk units 820 to bus 812, user interface adapter 822 for connecting keyboard 824, mouse 826, and/or other user interface devices such as a touch screen device (not shown) to bus 812. System 800 also includes communication adapter 834 for connecting data processing system 800 to a data processing network enabling the data processing system to communicate with other systems, and display adapter 836 for connecting bus 812 to display device 838. CPU 810 may include other circuitry not shown herein, which will include circuitry commonly found within a microprocessor, e.g., execution unit, bus interface unit, arithmetic logic unit, etc. CPU 810 may also reside on a single integrated circuit.

Display monitor 838 is connected to system bus 812 by display adapter 836. In this manner, a user is capable of inputting to the system throughout the keyboard 854, trackball 835 or mouse 856 and receiving output from the system via speaker 858, display 838.

Preferred implementations of the invention include implementations as a computer system programmed to execute the method or methods described herein, and as a computer program product. According to the computer system implementation, sets of instructions for executing the method or methods are resident in the random access memory 914 of one or more computer systems configured generally as described above. These sets of instructions, in conjunction with system components that execute them may generate multiple perspectives of a Web service and execute sample calls to the Web service. Until required by the computer system, the set of instructions may be stored as a computer program product in another computer memory, for example, in disk drive 820 (which may include a removable memory such as an optical disk or floppy disk for eventual use in the disk drive 820). Further, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 9:
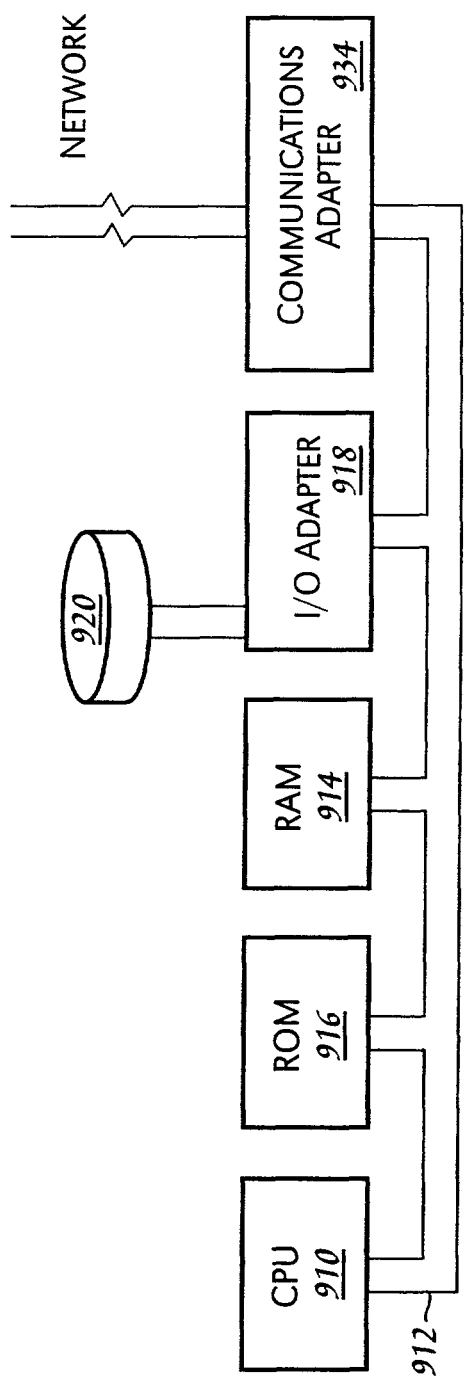
FIG. 9 illustrates, in block diagram form, a data processing system for generating document components for accessing Web services via a tag library to generate dynamic data in a Web page in accordance with an embodiment of the present invention.

FIG. 9 illustrates an exemplary hardware configuration of data processing system 900 in accordance with the subject invention. For example, page server 108 and Web application server 114, FIG. 1, may be implemented in accordance with data processing system 900. System 900 includes central processing unit (CPU) 910, such as a conventional microprocessor, and a number of other units interconnected via system bus 912. Data processing system 900 includes random access memory (RAM) 914, read only memory (ROM) 916, and input/output (I/O) adapter 918 for connecting peripheral devices such as disk units 920 to bus 912. System 900 also includes communication adapter 934 for connecting data processing system 900 to a data processing network enabling the data processing system to communicate with other systems. CPU 910 may include other circuitry not shown herein, which will include circuitry commonly found within a microprocessor, e.g., execution unit, bus interface unit, arithmetic logic unit, etc. CPU 910 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 914 of one or more computer systems configured generally as described above. These sets of instructions in conjunction with the system components which execute them, may execute sample calls to a Web service. Until required by the computer system, the set of instructions may be stored as a computer program product in another computer memory, for example, in disk drive 920 (which may include a removable memory such as an optical disk or floppy disk for eventual use in the disk drive 920). Further, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Although the present invention and its advantages have been described in detail, it should be understood that various changes, substitutions and alterations can be made herein without departing from the spirit and scope of the invention as defined by the appended claims.

What is claimed:

1. A method for displaying Web services comprising:
   generating a data model of a description of the Web service, wherein the description of the Web service defines messages a particular Web service accepts and generates;
   applying a perspective visitor to the data model, wherein the perspective visitor corresponds to a preselected domain; and
   displaying a perspective of the Web service associated with the preselected domain in response to the step of applying the perspective visitor, wherein the perspective visitor comprises a visitor pattern for encapsulating an operation to be performed on elements of the data model, wherein the data model comprises a data structure including at least one node corresponding to an operation of the Web service, and at least one child node of the node corresponding to the operation, the child node corresponding to one of an input and an output of the Web service.

2. The method of claim 1 wherein the step of applying the perspective visitor further includes:
passing in the at least one node and the at least one child node to the perspective visitor; and
populating the perspective corresponding to the preselected domain to generate a corresponding perspective representing the node passed in.

3. The method of claim 1 wherein the step of applying the perspective visitor to the data model further comprises:
traversing the data model by the perspective visitor, where each node sends a message to the perspective visitor which passes the node to the perspective visitor such that the node is passed to the perspective visitor by the node itself.

4. A method for displaying Web services comprising:
generating a data model of a description of the Web service, wherein the description of the Web service defines messages a particular Web service accepts and generates;
applying a perspective visitor to the data model, wherein the perspective visitor corresponds to a preselected domain;
displaying a perspective of the Web service associated with the preselected domain in response to the step of applying the perspective visitor, wherein the perspective visitor comprises a visitor pattern for encapsulating an operation to be performed on elements of the data model;
receiving user input sample data in response to the step of displaying the perspective; and
executing the Web service using the sample data.

5. A computer program product embodied in a machine-readable storage medium comprising programming instructions for performing the steps of:
generating a data model of a description of the Web service, wherein the description of the Web service defines messages a particular Web service accepts and generates;
applying a perspective visitor to the data model, wherein the perspective visitor corresponds to a preselected domain; and
displaying a perspective of the Web service associated with the preselected domain in response to the step of applying the perspective visitor, wherein the perspective visitor comprises a visitor pattern for encapsulating an operation to be performed on elements of the data model, wherein the data model comprises a data structure including at least one node corresponding to an operation of the Web service, and at least one child node of the node corresponding to the operation, the child node corresponding to one of an input and an output of the Web service.

6. The computer program product of claim 5 wherein programming for performing the step of applying the perspective visitor further includes programming for performing the steps of:
passing in the at least one node and the at least one child node to the perspective visitor; and
populating the perspective corresponding to the preselected domain to generate a corresponding perspective representing the node passed in.

7. The computer program product of claim 5 wherein the instructions for performing the step of applying the perspective visitor to the data model further comprises:
traversing the data model by the perspective visitor, where each node sends a message to the perspective visitor which passes the node to the perspective visitor such that the node is passed to the perspective visitor by the node itself.

8. A computer program product embodied in a machine-readable storage medium comprising programming instructions for performing the steps of:
generating a data model of a description of the Web service, wherein the description of the Web service defines messages a particular Web service accepts and generates;
applying a perspective visitor to the data model, wherein the perspective visitor corresponds to a preselected domain;
displaying a perspective of the Web service associated with the preselected domain in response to the step of applying the perspective visitor, wherein the perspective visitor comprises a visitor pattern for encapsulating an operation to be performed on elements of the data model;
receiving user input sample data in response to the step of displaying the perspective; and
executing a Web page calling the Web service using perspective and the sample data.

9. A data processing system for displaying Web services comprising:
circuitry operable for generating a data model of a description of the Web service, wherein the description of the Web service defines messages a particular Web service accepts and generates;
circuitry operable for applying a perspective visitor to the data model, wherein the perspective visitor corresponds to a preselected domain; and
circuitry operable for displaying a perspective of the Web service associated with the preselected domain in response to the step of applying the perspective visitor, wherein the perspective visitor comprises a visitor pattern for encapsulating an operation to be performed on elements of the data model, wherein the data model comprises a data structure including at least one node corresponding to an operation of the Web service, and at least one child node of the node corresponding to the operation, the child node corresponding to one of an input and an output of the Web service.

10. The system of claim 9 wherein the circuitry operable for applying the perspective visitor further includes:
circuitry operable for passing in the at least one node and the at least one child node to the perspective visitor; and
circuitry operable for populating the perspective corresponding to the preselected domain to generate a corresponding perspective representing the node passed in.

11. A data processing system for displaying Web services comprising:
circuitry operable for generating a data model of a description of the Web service, wherein the description of the Web service defines messages a particular Web service accepts and generates;
circuitry operable for applying a perspective visitor to the data model, wherein the perspective visitor corresponds to a preselected domain;
circuitry operable for displaying a perspective of the Web service associated with the preselected domain in response to the step of applying the perspective visitor, wherein the perspective visitor comprises a visitor pattern for encapsulating an operation to be performed on elements of the data model;

circuitry operable for receiving user input sample data in response to the step of displaying the perspective; and circuitry operable for executing a Web page calling the Web service using the perspective and the sample data.

12. A method for displaying Web services comprising:

generating a data model of a description of the Web service, wherein the description of the Web service is retrieved from a page server and defines messages a particular Web service accepts and generates;

applying a perspective visitor to the data model, wherein the perspective visitor corresponds to a preselected domain;

displaying a perspective of the Web service associated with the preselected domain in response to the step of applying the perspective visitor, wherein the perspective visitor comprises a visitor pattern for encapsulating an operation to be performed on elements of the data model, wherein the data model comprises a data structure including at least one node corresponding to an operation of the Web service, and at least one child node of the node corresponding to the operation, the child node corresponding to one of an input and an output of the Web service;

receiving user input sample data in response to the step of displaying the perspective; and executing the Web service, on a web services server which is a different server than the page server, using the sample data.

* * * * *